United States Patent
Zhu et al.

(10) Patent No.: US 11,965,092 B2
(45) Date of Patent: Apr. 23, 2024

(54) POLYURETHANE COMPOSITION, PREPARATION METHOD AND APPLICATION THEREOF

(71) Applicant: Covestro Intellectual Property GmbH & Co. KG, Leverkusen (DE)

(72) Inventors: Ying Dan Zhu, Shanghai (CN); Chen Jin, Guangdong (CN); Evgeny Avtomonov, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 337 days.

(21) Appl. No.: 17/268,716

(22) PCT Filed: Aug. 21, 2019

(86) PCT No.: PCT/EP2019/072368
§ 371 (c)(1),
(2) Date: Feb. 16, 2021

(87) PCT Pub. No.: WO2020/078604
PCT Pub. Date: Apr. 23, 2020

(65) Prior Publication Data
US 2021/0317306 A1    Oct. 14, 2021

(30) Foreign Application Priority Data

Aug. 24, 2018  (CN) .......................... 201810978328.9
Oct. 18, 2018  (EP) ..................................... 18201270

(51) Int. Cl.
| | | |
|---|---|---|
| C08L 75/04 | (2006.01) | |
| C08G 18/10 | (2006.01) | |
| C08G 18/48 | (2006.01) | |
| C08G 18/62 | (2006.01) | |
| C09D 7/20 | (2018.01) | |
| C09D 7/48 | (2018.01) | |
| C09D 175/04 | (2006.01) | |
| C09J 5/06 | (2006.01) | |
| C09J 11/06 | (2006.01) | |
| C08K 3/32 | (2006.01) | |
| C08K 5/00 | (2006.01) | |
| C08K 5/13 | (2006.01) | |
| C08K 5/17 | (2006.01) | |

(52) U.S. Cl.
CPC .............. *C08L 75/04* (2013.01); *C08G 18/10* (2013.01); *C08G 18/4825* (2013.01); *C08G 18/6204* (2013.01); *C09D 7/20* (2018.01); *C09D 7/48* (2018.01); *C09D 175/04* (2013.01); *C09J 5/06* (2013.01); *C09J 11/06* (2013.01); *C08G 2150/00* (2013.01); *C08G 2170/80* (2013.01); *C08K 3/32* (2013.01); *C08K 2003/321* (2013.01); *C08K 5/005* (2013.01); *C08K 5/13* (2013.01); *C08K 5/175* (2013.01); *C08L 2201/54* (2013.01)

(58) Field of Classification Search
CPC ........ C09D 175/04; C09D 7/48; C08K 5/005; C08L 75/04
See application file for complete search history.

(56) References Cited

U.S. PATENT DOCUMENTS

| | | |
|---|---|---|
| 3,923,713 A | 12/1975 | Hermann |
| 4,870,129 A | 9/1989 | Henning et al. |
| 5,130,198 A | 7/1992 | Swisher et al. |
| 5,484,656 A | 1/1996 | Swisher et al. |
| 7,091,280 B2 | 8/2006 | Rische et al. |
| 9,994,730 B2 | 6/2018 | Tennebroek et al. |
| 2003/0194556 A1 | 10/2003 | Rische et al. |
| 2016/0333193 A1* | 11/2016 | Okumura ............. D06N 3/0006 |
| 2017/0298231 A1* | 10/2017 | Yuasa ................... C09D 5/084 |
| 2017/0335120 A1* | 11/2017 | Gelling ................. C08G 18/80 |

FOREIGN PATENT DOCUMENTS

| | | |
|---|---|---|
| AU | 6077794 A | 11/1994 |
| CN | 1894299 A | 1/2007 |
| CN | 101348703 A | 1/2009 |
| CN | 103773210 A | 5/2014 |
| CN | 104387548 A | 3/2015 |
| CN | 106928422 A | 7/2017 |
| EP | 0057396 A2 | 8/1982 |
| JP | 2009143765 A | 7/2009 |
| WO | 2018158278 A1 | 9/2018 |

OTHER PUBLICATIONS

International Search Report for related Application No. PCT/EP2019/072368, dated Nov. 21, 2019, 3 pages.
Zhu, Liang et al., Preparation and Characterization of Yellowing Resistant WPU, Synthesis Technology, vol. 35, No. 11, Nov. 2014, China Academic Journal Electronic Publishing House (translation of Abstract attached).

\* cited by examiner

*Primary Examiner* — Michael M Dollinger
(74) *Attorney, Agent, or Firm* — The Webb Law Firm

(57) ABSTRACT

The present invention relates to a composition, preparation and use thereof, and a product coated with the composition. The composition comprises: (a) a polyurethane polymer which is a reaction product comprising the following components: (a1) a polyisocyanate, (a2) a compound having an isocyanate-reactive group, which comprises a polymer polyol selected from one or more of the following: a polyether polyol and a polyolefin polyol, (a3) optionally an emulsifier, (a4) optionally a solvent, and (a5) optionally a reactive diluent; (b) an organic antioxidant in an amount of 0.01 wt % to 2.4 wt %, based on the total weight of solid components of the composition; (c) a chelating agent; and (d) water. The composition according to the present invention has good high-temperature yellowing resistance.

17 Claims, No Drawings

POLYURETHANE COMPOSITION, PREPARATION METHOD AND APPLICATION THEREOF

CROSS-REFERENCE TO RELATED APPLICATION

This application is a national stage application under 35 U.S.C. § 371 of PCT/EP2019/072368, filed Aug. 21, 2019, which claims the benefit of European Application No. 18201270.8, filed Oct. 18, 2018, and Chinese Application No. 201810978328.9, filed Aug. 24, 2018, each of which is incorporated herein by reference.

TECHNICAL FIELD

The present invention relates to a composition, preparation and use thereof, in particular in the field of coatings and adhesives, as well as a product coated with the composition.

BACKGROUND

A polyurethane polymer and water can be mixed to form an aqueous polyurethane dispersion. The aqueous polyurethane dispersions can be used in the field of coatings and adhesives. In the field of adhesives, aqueous polyurethane dispersions are typically applied to a substrate surface, and then heated to remove water from the dispersion through evaporation, followed by heat activation (e.g., infrared heating) of the coating, and the substrate surface to which the dispersion is applied is finally contacted with an additional substrate surface to obtain a bonded product. In practice, if the temperature required for the heat activation is high, not only does it require more energy, but it also increases the difficulty of manual application and bonding. Therefore, it is desirable in the industry to find an adhesive suitable for the heat activation at a lower temperature.

U.S. Pat. No. 4,870,129 A discloses an adhesive comprising an isocyanate group-containing crosslinking agent and a hydroxyl-containing aqueous polyurethane dispersion, wherein the coating formed by the composition requires a heat activation temperature of 40° C. to 80° C. However, the adhesive has the disadvantages of being prone to yellowing and an unpleasant appearance.

The yellowing of an adhesive is often caused due to the oxidation of its polymer. When the adhesive is exposed to heat or UV light, the oxidation process is accelerated, resulting in an increase in yellowing. The yellowing of an adhesive not only worsens the appearance of the resultant bonded product, but also indicates the aging of the adhesive and the decrease of the mechanical properties of the bonded product obtained by using the adhesive. In practice, coatings and adhesives are often used under a high temperature environment. For example, in case of an adhesive subject to a glass fiber sizing process, the adhesive is first applied to the glass fiber, and then dried at a high temperature to form a plastic sheet.

EP 0 356 655 B1 discloses a composition for reinforcement materials, comprising at least one crosslinkable polyurethane, a silicone coupling agent, a copolymer of an acrylic monomer and a polymerizable monomer, a crosslinking agent, a metal chelating agent and water, wherein the metal chelating agent is a polydentate compound or a compound having the formula of $(RH_{2n}C_n)_2N(CH_2)_xN(C_nH_{2n}R)_2$. The glass fiber reinforced polymers treated with the above composition have good mechanical properties even after prolonged exposure to a solvent, a high temperature or UV.

EP 0 381 125 B1 discloses a composition which is not easily oxidizable and can be applied to fiber sizing. The composition comprises: a component A comprising a thermoplastic polyester, a polyoxyalkylene, ethylene glycol, polyvinyl alcohol, a polyolefin latex, polyvinyl acetate, an epoxy resin, starch, a combination of an epoxy polymer and polyvinyl alcohol, a combination of an epoxy polymer and a polyurethane; a component B which is a metal chelating agent selected from a polydentate compound or a compound having the formula of $(RH_{2n}C_n)_2N(CH_2)_xN(C_nH_{2n}R)_2$; components C and D both of which are antioxidants. The products obtained by treating the fiber with the above composition have good mechanical properties even after prolonged exposure to a high temperature.

AU A 60777/94 discloses an aqueous polymer dispersion as an adhesive, comprising a polyurethane and a chelating agent containing a polyvalent metal and a polydentate compound. The adhesive has high strength even at a high temperature.

Although the above technical solutions solve the problems of aging and the decrease of mechanical properties of coatings and adhesives at a high temperature, they fail to refer to the problem of heat-temperature yellowing of coatings and adhesives.

CN 104387548 discloses a polyurethane resin which is not prone to yellowing and prepared from an aliphatic polyether polyol, an aliphatic polyester polyol, an aliphatic isocyanate, an aliphatic chain extender and an antioxidant.

JP 2009143765 discloses an adhesive for glass fiber sizing, which is not prone to yellowing under high-temperature conditions. The adhesive comprises a pyrophosphate and a polyurethane, wherein the pyrophosphate has an amount of 10 wt % to 75 wt % based on the weight of the polyurethane solid.

CN 106928422 discloses a method for preparing a yellowing resistant polyurethane, comprising the steps of: (1) reacting a diisocyanate and a diol in the presence of a catalyst to obtain a reactant; (2) reacting the reactant with a chain extender to obtain a chain-extended product; and (3) reacting the chain-extended product with an epoxy resin to obtain a yellowing resistant polyurethane product.

U.S. Pat. No. 7,091,280 discloses an adhesive comprising an aqueous polyurethane dispersion and a stabilizer. The adhesive is yellowing resistant.

Therefore, it is desirable to develop a composition that forms a coating having good yellowing resistance.

SUMMARY OF THE INVENTION

It is an object of the present invention to provide a composition, particularly a yellowing resistant coating and adhesive, preparation and application thereof, and a product coated with the composition.

The composition according to the present invention comprises:
(a) a polyurethane polymer which is a reaction product comprising the following components:
(a1) a polyisocyanate,
(a2) a compound having an isocyanate-reactive group, which comprises a polymer polyol selected from one or more of the following: a polyether polyol and a polyolefin polyol,
(a3) optionally an emulsifier,
(a4) optionally a solvent, and
(a5) optionally a reactive diluent;

(b) an organic antioxidant in an amount of 0.01 wt % to 2.4 wt %, based on the total weight of solid components of the composition;
(c) a chelating agent;
(d) water;
(e) optionally a stabilizer;
(f) optionally a crosslinking agent; and
(g) optionally an additive.

In one aspect of the invention, there is provided a method for producing the composition provided according to the invention, comprising the step of mixing, in any desired manner, the polyurethane polymer (a) or the components for preparing the polyurethane polymer, the organic antioxidant (b), the chelating agent (c), water (d), optionally a stabilizer (e), optionally a crosslinking agent (f), and optionally an additive (g).

In another aspect of the invention, the composition provided according to the invention is used for the production of a coated product.

In still another aspect of the invention, there is provided a coating method comprising the steps of applying the composition provided according to the invention to a substrate surface and then curing it.

In yet another aspect of the invention, there is provided a coated product comprising a substrate and a coating formed by applying the composition provided according to the invention to the substrate.

In yet another aspect of the invention, there is provided a method for producing a bonded product comprising the steps of:
i. applying the composition according to the invention to at least one surface of a substrate;
ii. heating and drying the substrate surface to which the composition is applied; and
iii. contacting the substrate surface treated in step ii with a surface of the substrate itself or an additional substrate to obtain the bonded product.

In yet another aspect of the invention, there is provided a bonded product produced by the method provided according to the invention.

The composition according to the invention has good yellowing resistance.

DETAILED DESCRIPTION

The present invention provides a composition comprising:
(a) a polyurethane polymer which is a reaction product comprising the following components:
(a1) a polyisocyanate,
(a2) a compound having an isocyanate-reactive group, which comprises a polymer polyol selected from one or more of the following: a polyether polyol and a polyolefin polyol,
(a3) optionally an emulsifier,
(a4) optionally a solvent, and
(a5) optionally a reactive diluent;
(b) an organic antioxidant in an amount of 0.01 wt % to 2.4 wt %, based on the total weight of solid components of the composition;
(c) a chelating agent;
(d) water;
(e) optionally a stabilizer;
(f) optionally a crosslinking agent; and
(g) optionally an additive.

The present invention also provides a preparation method and application of the composition, in particular in the field of coatings and adhesives, as well as a product coated with the composition.

The term "curing" as used herein refers to the process of a liquid composition from a liquid state to a solid state.

The term "composition" as used herein refers to a mixture of chemical components that will cure upon application and form a coating. The composition according to the invention may be a coating or an adhesive.

The term "coating" as used herein refers to a composition that can be applied to a surface of an article by different coating processes to form a firm and continuous solid coating having a certain strength.

The term "adhesive" as used herein refers to a composition that can be applied to a surface of an article by different coating processes to form a coating on the surface of the article itself or on the surfaces of one article and another article, and bond the surface of the article itself or the surfaces of one article and another article. It is also used as a synonym for tackiness agents and/or sealants and/or binders.

Polyurethane Polymer (a)

The term "polyurethane polymer" as used herein refers to a polyurethaneurea polymer and/or a polyurethane polyurea polymer and/or a polyurea polymer and/or a polythiourethane polymer.

The polyurethane polymer preferably does not comprise a hydrolyzable group.

The term "hydrolyzable group" as used herein refers to a polyester group, a polycarbonate group, and a polyanhydride group.

Polyisocyanate (a1)

The polyisocyanate preferably has a functionality of no less than 2, further preferably 2 to 4.

The polyisocyanate preferably has an amount of 5 wt % to 70 wt %, further preferably 5 wt % to 40 wt %, more preferably 5 wt % to 35 wt %, and most preferably 10 wt % to 30 wt %, based on the total weight of the components for preparing the polyurethane polymer.

The polyisocyanate is preferably one or more of the following: an aliphatic polyisocyanate, an alicyclic polyisocyanate, an aromatic polyisocyanate, and their derivatives having iminooxadiazinedione, isocyanurate, uretdione, carbamate, allophanate, biuret, urea, oxadiazinetrione, oxazolidinone, acyl urea and/or carbodiimide groups.

The aliphatic polyisocyanate is preferably one or more of the following: 1,6-hexane diisocyanate, 2,2-dimethylpentane diisocyanate, 2,2,4-trimethylhexane diisocyanate, butylene diisocyanate, 1,3-butadiene-1,4-diisocyanate, 2,4,4-trimethyl-1,6-hexane diisocyanate, 1,6,11-undecane triisocyanate, 1,3,6-hexamethylene triisocyanate, 1,8-diisocyanato-4-isocyanatomethyl octane, bis(isocyanatoethyl) carbonate, bis(isocyanatoethyl) ether, lysine methyl ester diisocyanate, lysine triisocyanate, bis(isocyanatomethyl)sulfide, bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatoethyl)disulfide, bis(isocyanatopropyl)disulfide, bis(isocyanatomethylthio)methane, bis(isocyanatoethylthio) methane, bis(isocyanatomethylthio)ethane, bis(isocyanatoethylthio)ethane, 1,5-diisocyanato-2-isocyanatomethyl-3-thiapentane, 1,2,3-tris(isocyanatomethylthio)propane, 1,2,3- tris(isocyanatoethylthio)propane, 3,5-dithia-1,2,6,7-heptane tetraisocyanate, 2,6-diisocyanatomethyl- 3,5-dithia-1,7-heptane diisocyanate, 2,5-diisocyanatomethylthiophane, isocyanatoethylthio-2,6-dithia-1,8-octane diisocyanate, thiobis(3-isothiocyanatopropane), thiobis(2-isothiocyanatoethane), dithiobis(2-isothiocyanatoethane), hexamethylene diisocyanate and isophorone diisocyanate, and most preferably one or more of the following: 1,6-hexane diisocyanate and hexamethylene diisocyanate.

The alicyclic polyisocyanate is preferably one or more of the following: 2,5-bis(isocyanatomethyl)-bicyclo[2.2.1]heptane, 2,6-bis(isocyanatomethyl)-bicyclo[2.2.1]heptane, bis(isocyanatomethyl)cyclohexane, isophorone diisocyanate, 2,5-diisocyanatotetrahydrothiophene, 2,5-diisocyanatomethyltetrahydrothiophene, 3,4-diisocyanatomethyltetrahydrothiophene, 2,5-diisocyanato-1,4-dithiane, 2,5-diisocyanatomethyl-1,4-dithiane, 4,5-diisocyanato-1,3-dithiolane, 4,5-bis(isocyanatomethyl)-1,3-dithiolane, 4,5-diisocyanatomethyl-2-methyl-1,3-dithiolane, norbornane diisocyanate (NBDI), xylylene diisocyanate (XDI), hydrogenated xylylene diisocyanate ($H_6$XDI), 1,4-cyclohexane diisocyanate ($H_6$PPDI), 1,5-pentane diisocyanate (PDI), m-tetramethylxylylene diisocyanate (m-TMXDI), methylene-bis(4-cyclohexylisocyanate) and cyclohexane diisothiocyanate, and most preferably one or more of the following: isophorone diisocyanate and methylene-bis(4-cyclohexylisocyanate).

The aromatic polyisocyanate is preferably one or more of the following: 1,2-diisocyanatobenzene, 1,3-diisocyanatobenzene, 1,4-diisocyanatobenzene, 2,4-diisocyanatotoluene, ethylphenylene diisocyanate, isopropylphenylene diisocyanate, toluene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenylisocyanate), 4,4'-methylene bis(2-methylphenylisocyanate), bibenzyl-4,4'-diisocyanate, bis(isocyanatophenyl)ethylene, bis(isocyanatomethyl)benzene, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl)ether, bis(isocyanatoethyl)phthalate, 2,6-di(isocyanatomethyl)furan, 2-isocyanatophenyl-4-isocyanatophenyl sulfide, bis(4-isocyanatophenyl)sulfide, bis(4-isocyanatomethylphenyl)sulfide, bis(4-isocyanatophenyl)disulfide, bis(2-methyl-5-isocyanatophenyl)disulfide, bis(3-methyl-5-isocyanatophenyl)disulfide, bis(3-methyl-6-isocyanatophenyl)-disulfide, bis(4-methyl-5-isocyanatophenyl)disulfide, bis(4-methoxy-3-isocyanatophenyl)disulfide, 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene bis(phenylisothiocyanate), 4,4'-methylene bis(2-methylphenylisothiocyanate), 4,4'-methylene bis(3-methylphenylisothiocyanate), 4,4'-diisothiocyanatobenzophenone, 4,4'-diisothiocyanato-3,3'-dimethylbenzophenone, bis(4-isothiocyanatophenyl)ether, 1-isothiocyanato-4-[(2-isothiocyanato)sulfonyl]benzene, thiobis(4-isothiocyanatobenzene), sulfonyl(4-isothiocyanatobenzene), hydrogenated tolylene diisocyanate ($H_6$TDI), diphenylmethane diisocyanate and dithiobis(4-isothiocyanatobenzene), and most preferably one or more of the following: toluene diisocyanate, 1,2-diisocyanatobenzene, 1,3-diisocyanatobenzene, 1,4-diisocyanatobenzene, diphenylmethane diisocyanate and 2,4-diisocyanatotoluene.

The polyisocyanate can also be have both an isocyanate group and an isothiocyanate group, such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanatophenyl-4-isothiocyanatophenyl sulfide and 2-isocyanatoethyl-2-isothiocyanatoethyl disulfide.

The polyisocyanate can also be a halo-substituted, such as chloro-, bromo-, alkyl-, alkoxy-, nitro- or silane-substituted derivative of the above polyisocyanates, such as isocyanatopropyltriethoxysilane or isocyanatopropyltrimethoxysilane.

Compound Having an Isocyanate-Reactive Group
(a2)

The term "isocyanate-reactive group" as used herein refers to a group containing Zerevitinov-active hydrogen. Zerevitinov-active hydrogen is defined in Rompp's Chemical Dictionary (Rommp Chemie Lexikon), 10th ed., Georg Thieme Verlag Stuttgart, 1996. Generally, the group containing Zerevitinov-active hydrogen is understood in the art as a hydroxyl (OH) group, an amino ($NH_x$) group, and a thiol (SH) group.

The compound having an isocyanate-reactive group preferably has an amount of 5 wt % to 95 wt %, preferably 10 wt % to 90 wt %, based on the total weight of the components for preparing the polyurethane polymer.

The polymer polyol preferably has an amount of 70 wt % to 100 wt %, further preferably 75 wt % to 100 wt %, more preferably 80 wt % to 100 wt %, and most preferably 90 wt % to 100 wt %, based on the total weight of the compound having an isocyanate-reactive group.

The compound having an isocyanate-reactive group preferably does not contain a group capable of forming a hydrolyzable group.

The term "a group capable of forming a hydrolyzable group" as used herein refers to an ester group, a carbonate group, an amide group, and an anhydride group.

The polymer polyol is preferably a polyether polyol.

The polyether polyol preferably has a hydroxyl functionality of 1.5 to 6.0, and most preferably 1.8 to 3.0.

The polyether polyol preferably has a hydroxyl value of 50 mg KOH/g to 700 mg KOH/g, and most preferably 50 mg KOH/g to 600 mg KOH/g.

The polyether polyol preferably has a number average molecular weight of 400 g/mol to 4000 g/mol, and most preferably 500 g/mol to 3000 g/mol.

The polyether polyol is preferably one or more of the following: a polyaddition product of an alkylene oxide, a condensation product of a polyol or a mixture of polyols, and an alkoxylation product of a polyfunctional alcohol, amine and amino alcohol, further preferably an alkoxylation product of a polyfunctional alcohol, amine and amino alcohol, and most preferably one or more of the following: poly(propylene oxide) polyol having a number average molecular weight of 400 g/mol to 4000 g/mol and polyoxytetramethylene polyol having a number average molecular weight of 400 g/mol to 4000 g/mol.

The polyaddition product of an alkylene oxide is preferably one or more of the following: the polyaddition products of ethylene oxide, 1,2-propylene oxide, 1,2-butylene oxide, 2,3-butylene oxide, tetrahydrofuran, styrene oxide or epichlorohydrin, and the co-polyaddition products and graft products thereof.

The alkoxylation product of a polyfunctional alcohol, amine and amino alcohol is preferably the alkoxylation products of a hydroxy functional starting molecule such as ethylene glycol, 1,2-propanediol, 1,3-propanediol, 1,4-butanediol, hexanediol, diethylene glycol, trimethylolpropane, glycerol, pentaerythritol, sorbitol or mixtures thereof with propylene oxide or butylene oxide.

The polyether polyol herein having a corresponding high hydroxyl content but a very low molecular weight may be water soluble.

However, the polyether polyol is particularly preferably one or more of the following: water-insoluble poly(propylene oxide) polyol having a number average molecular weight of 500 g/mol to 3000 g/mol and water-insoluble poly(tetramethylene oxide) polyol having a number average molecular weight of 500 g/mol to 3000 g/mol.

The "water-insoluble polyol" as used herein refers to that the solubility of the polyol in water at 23° C. is less than 10 g/l, preferably less than 5 g/l. That is to say, the polyol precipitates when dispersed in water in an experiment.

Emulsifier (a3)

The term "emulsifier" as used herein is a compound comprising an emulsifying group or a latent emulsifying group.

The emulsifier has an amount of 0.1 wt % to 20 wt %, based on the total weight of the components for preparing the polyurethane polymer.

The emulsifier preferably comprises at least one isocyanate-reactive group and at least one emulsifying group or latent emulsifying group.

The isocyanate-reactive group is preferably one or more of the following: a hydroxyl group, a thiol group, and an amino group.

The emulsifying group or latent emulsifying group is preferably one or more of the following: a sulfonic acid group, a carboxylic acid group, a tertiary amino group, and a hydrophilic polyether.

The emulsifier comprising a sulfonic acid group and/or a carboxylic acid group is preferably one or more of the following: a diamino compound comprising a sulfonic acid group and/or a carboxylic acid group and a dihydroxy compound comprising a sulfonic acid group and/or a carboxylic acid group, further preferably one or more of the following: sodium, potassium, lithium, and tertiary amine salts of N-(2-aminoethyl)-2-aminoethanesulfonic acid, N-(3-aminopropyl)-2-aminoethanesulfonic acid, N-(3-aminopropyl)-3-aminopropanesulfonic acid, N-(2-aminoethyl)-3-aminopropanesulfonic acid, similar carboxylic acids, dimethylolpropionic acid or dimethylolbutanoic acid, and most preferably one or more of the following: N-(2-aminoethyl)-2-aminoethanesulfonates and dimethylolpropionic acid.

The sulfonic acid group or carboxylic acid group can be used directly in the form of their salts, such as sulfonates or carboxylates.

The sulfonic acid group or carboxylic acid group can also be obtained by partially or completely adding a neutralizing agent for salt formation during or after the preparation of the polyurethane polymer.

The neutralizing agent for salt formation is preferably one or more of the following: triethylamine, dimethylcyclohexylamine, ethyldiisopropylamine, ammonia, diethanolamine, triethanolamine, dimethylethanolamine, sodium hydroxide, potassium hydroxide, lithium hydroxide, calcium hydroxide, methyldiethanolamine and aminomethylpropanol, and most preferably one or more of the following: triethylamine, dimethylcyclohexylamine and ethyldiisopropylamine.

Solvent (a4)

The solvent has an amount of 0.001 wt % to 20 wt %, based on the total weight of the components for preparing the polyurethane polymer.

The solvent is preferably one or more of the following: acetone, 2-butanone, tetrahydrofuran, xylene, toluene, cyclohexane, butyl acetate, dioxane acetic acid, methoxypropyl acetate, N-methylpyrrolidone, N-ethylpyrrolidone, acetonitrile, dipropylene glycol dimethyl ether, and a solvent containing an ether or ester unit, are most preferably one or more of the following: acetone and 2-butanone.

The solvent may be added only at the beginning of the preparation, or a portion may be further added during the preparation as needed.

Reactive Diluent (a5)

The reactive diluent has an amount of 0.001 wt % to 90 wt %, based on the total weight of the components for preparing the polyurethane polymer.

The reactive diluent is preferably one or more of the following: an acrylic acid and an acrylate.

The acrylate is preferably a methacrylate.

External Emulsifier (a6)

The components for preparing the polyurethane polymer may further comprise an external emulsifier (a6).

The external emulsifier component has an amount of 0.001 wt % to 10 wt %, based on the total weight of the components for preparing the polyurethane polymer.

The external emulsifier is preferably a fatty alcohol polyether, and most preferably one or more of the following: an aliphatic ethylene glycol polyether and an aliphatic propylene glycol polyether.

The polyurethane polymer preferably has an amount of 10 wt % to 99.5 wt %, based on the total weight of solid components of the composition.

The polyurethane polymer most preferably has an amount of 90 wt % to 99.5 wt %, based on the total weight of solid components of the composition.

The polyurethane polymer may be added in the form of a solid or a dispersion obtained after mixing it with water of the composition to form an aqueous polyurethane dispersion, most preferably directly in the form of a dispersion.

Organic Antioxidant (b)

The organic antioxidant (b) preferably has an amount of 0.06 wt % to 2.0 wt %, based on the total weight of solid components of the composition.

The organic antioxidant is preferably one or more of the following: a carbamic acid compound of a metal, a phenolic antioxidant, an amine antioxidant, and a heterocyclic antioxidant, and most preferably a phenolic antioxidant.

The metal is preferably one or more of the following: copper, zinc, molybdenum, and antimony.

The phenolic antioxidant is preferably one or more of the following: an alkyl hindered phenol, a polycyclic hindered phenol, and an alkylthio hindered phenol.

The amine antioxidant is preferably one or more of the following: a phenylenediamine antioxidant, a diphenylamine antioxidant, a phenyl-α-naphthylamine antioxidant, and a phenothiazine antioxidant.

The heterocyclic antioxidant is preferably one or more of the following: a sulfur-containing compound and a nitrogen-containing heterocyclic compound.

Chelating Agent (c)

The term "chelating agent" as used herein refers to a compound capable of forming a stable complex with a metal ion, particularly a heavy metal ion or a transition metal ion.

The chelating agent preferably has an amount of 0.04 wt % to 1.8 wt %, further preferably 0.04 wt % to 1 wt %, more preferably 0.05 wt % to 1 wt %, and most preferably 0.1 wt % to 1 wt %, based on the total weight of solid components of the composition.

The chelating agent is preferably present in the form of one or more of the following: a chelating agent salt, a chelating agent acid, and a chelating agent ester, further preferably in the form of a chelating agent salt and/or a chelating agent acid, and most preferably in the form of a chelating agent salt.

The chelating agent salt is preferably a water-soluble chelating agent salt.

The solubility of the water-soluble chelating agent salt in water is preferably no less than 0.15 g/100 g of water, and most preferably no less than 1 g/100 g of water, measured at room temperature of 20° C.

The water-soluble chelating agent salt preferably meets the following conditions: the pH value of the aqueous solution of the water-soluble chelating agent salt having an content of $4.3*10^{-7}$ mol/g is more than 5, preferably more than 6, and most preferably more than 9.

The water-soluble chelating agent salt is preferably one or more of the following: an ethylenediamine tetraacetate, a tartrate, a citrate, a pyrophosphate, a tripolyphosphate, a hexametaphosphate, aminotrimethylenephosphonic acid, ethylenediamine tetramethylenephosphonic acid, diethylenetriamine pentamethylenephosphonic acid and a gluconate, further preferably one or more of the following: an ethylenediamine tetraacetate, a tartrate, a citrate, a pyrophosphate, a tripolyphosphate, a hexametaphosphate and a gluconate, and most preferably one or more of the following: an ethylenediamine tetraacetate and a pyrophosphate.

The ethylenediamine tetraacetate is preferably tetrasodium ethylenediamine tetraacetate.

The pyrophosphate is preferably sodium pyrophosphate.

The chelating acid may be insoluble or soluble in water.

The pH value of the chelating agent acid is preferably 1 to 6.

The chelating agent acid is preferably one or more of the following: an aminocarboxylic acid, a hydroxycarboxylic acid, an inorganic polyphosphoric acid, a hydroxyaminocarboxylic acid, an organic polyphosphonic acid, and a polycarboxylic acid, further preferably one or more of the following: ethylenediamine tetraacetic acid, nitrilotriacetic acid, tartaric acid, citric acid, pyrophosphoric acid, tripolyphosphoric acid, hexametaphosphoric acid, and gluconic acid, more preferably one or more of the following: ethylenediamine tetraacetic acid, nitrilotriacetic acid, tartaric acid, citric acid, pyrophosphoric acid and gluconic acid, and most preferably one or more of the following: ethylenediamine tetraacetic acid and nitrilotriacetic acid.

The aminocarboxylic acid is preferably nitrilotriacetic acid.

Stabilizer (e)

The composition may further comprise a stabilizer. The stabilizer advantageously reduces the hydrolysis of the composition and thereby extends the pot life of the composition.

The term "pot life" as used herein refers to a time period from the initial mixing of two or more mutually reactive components of the composition to the time when the resulting composition has a viscosity of 2500 cps at 25° C. measured according to ASTM Standard D 7395-07 using a suitable Brookfield R/S rheometer having a C50-1 mandrel.

The stabilizer is preferably one or more of the following: a carbodiimide compound, an epoxy compound, an oxazoline compound, and an aziridine compound.

The stabilizer preferably has an amount of 0.5 wt % to 10 wt %, and most preferably 0.5 wt % to 2 wt %, based on the total weight of solid components of the composition.

Crosslinking Agent (f)

The composition may further comprise a crosslinking agent.

The crosslinking agent is preferably one or more of the following: an isocyanate group-containing compound and a polycarbodiimide group-containing compound.

The crosslinking agent preferably has an amount of 0.1 wt % to 10 wt %, based on the total weight of solid components of the composition.

Additive (g)

The composition may further comprise an additive. The additive is preferably one or more of the following: a co-adhesive, a thickener, an adhesion promoter, a lubricant, a wetting additive, a dye, a light stabilizer, an aging inhibitor, a pigment, a flow controlling agent, an antistatic agent, a UV absorber, a film forming aid, an antifoaming agent and a plasticizer.

The amount of the additive is well known to those skilled in the art.

Polymer different from the polyurethane polymer (h)

The composition may further comprise a polymer different from the polyurethane polymer.

The polymer different from the polyurethane polymer preferably does not contain a hydrolyzable group.

The weight ratio of the polymer different from the polyurethane polymer to the polyurethane polymer is preferably from 1:10 to 10:1.

The composition is preferably a coating or an adhesive, further preferably an adhesive, and most preferably a yellowing resistant adhesive.

Method for Producing the Composition

Preferably, the polyurethane polymer (a) and water (d) form an aqueous polyurethane dispersion, and then the organic antioxidant (b), the chelating agent (c), optionally a stabilizer (e), optionally a crosslinker (f) and optionally an additive (g) are introduced to obtain the composition.

Preferably, the polyurethane polymer (a) and water (d) form an aqueous polyurethane dispersion, and then the organic antioxidant (b), the chelating agent (c), optionally a stabilizer (e), optionally a crosslinker (f), optionally an additive (g), and optionally a polymer (h) different from the polyurethane polymer are introduced to obtain the composition.

The water in the composition may be introduced before the formation of the polyurethane polymer, during the formation of the polyurethane polymer, or after the formation of the polyurethane polymer. The water is preferably introduced after the formation of the polyurethane polymer.

The water and the polyurethane polymer are mixed to form an aqueous polyurethane dispersion.

The term "aqueous polyurethane dispersion" is also used as a synonym for an aqueous polyurethaneurea dispersion and/or an aqueous polyurethane polyurea dispersion and/or an aqueous polyurea dispersion.

A catalyst such as dibutyltin dilaurate may be added when preparing the polyurethane polymer.

The polyurethane polymer is preferably prepared by a prepolymer mixing method, an acetone method or a melt dispersion method, and most preferably by an acetone method.

The order for mixing the components of the polyurethane polymer can be carried out in a conventional manner.

The polyisocyanate and the compound having an isocyanate-reactive group may be added in one portion or in multiple portions, and each portion may have the same component(s) as previously added or different ones.

The organic solvent present in the polyurethane polymer can be removed by distillation. The organic solvent may be removed during the formation of the polyurethane polymer, or may be removed after the formation of the polyurethane polymer.

The amount of the organic solvent remaining in the polyurethane polymer is preferably less than 1.0 wt %, based on the total weight of the polyurethane polymer.

The chelating agent can be added in the form of a solid or an aqueous solution. It is preferably added in the form of an aqueous solution of the chelating agent, which will be more advantageous for the dispersion of the chelating agent.

The water-soluble chelating agent salt may be directly added, or may be formed by means of acid-base neutralization in the composition. The acid-base neutralization may be complete or partial neutralization, preferably complete neutralization.

The chelating agent may be added during the chain extension or neutralization for preparing the polyurethane polymer, or may be added after the chain extension, or may be added during or after the dispersion of the polyurethane polymer in water, or may be added during or after the distillation of the polyurethane polymer.

The acid may be a free acid which is neutralized with a base to form a water-soluble chelating agent salt. The free acid is preferably one or more of the following: an aminocarboxylic acid, a hydroxycarboxylic acid, an inorganic polyphosphoric acid, a hydroxyaminocarboxylic acid, an organic polyphosphonic acid, and a polycarboxylic acid.

The aminocarboxylic acid is preferably one or more of the following: ethylenediamine tetraacetic acid and aminotriacetic acid.

The hydroxycarboxylic acid is preferably one or more of the following: tartaric acid, citric acid, and gluconic acid.

The inorganic polyphosphoric acid is preferably one or more of the following: tripolyphosphoric acid, hexametaphosphoric acid, and pyrophosphoric acid.

The hydroxyaminocarboxylic acid is preferably one or more of the following: hydroxyethylethylenediamine triacetic acid and dihydroxyethylglycine.

The aqueous polyurethane dispersion preferably has a solid content of 30 wt % to 70 wt %, based on the total weight of the aqueous polyurethane dispersion.

Coating Method

The substrate is preferably one or more of the following: wood, plastic, metal, glass, textile, alloy, fabric, artificial leather, paper, cardboard, EVA, rubber, dermis, glass fiber, ethylene vinyl acetate copolymer, polyolefin, thermoplastic polyurethane, polyurethane foam, polymer fiber and graphite fiber, and most preferably one or more of the following: EVA, rubber, dermis, artificial leather, ethylene vinyl acetate copolymer, polyolefin, thermoplastic polyurethane and polyurethane foam.

Said "applying" may be applying the adhesive to the entire surface of the substrate or only to one or more portions of the substrate surface.

Said "applying" may be brushing, dipping, spraying, roller coating, knife coating, flow coating, casting, printing or transfer printing, preferably brushing, dipping or spraying.

Method for Producing a Bonded Product

Preferably, the method further comprise a step iv between step ii and step iii:
 iv. irradiating the substrate surface treated in step ii by means of actinic radiation.

The method for producing a bonded product preferably comprises the following steps:
 i. applying the adhesive provided according to the present invention to at least one surface of a substrate;
 ii. heating and drying the substrate surface to which the adhesive is applied;
 iv. irradiating the substrate surface treated in step ii by means of actinic radiation; and
 iii. contacting the substrate surface treated in step iv with a surface of the substrate itself or an additional substrate to obtain the bonded product.

The substrate is preferably one or more of the following: wood, plastic, metal, glass, textile, alloy, fabric, artificial leather, paper, cardboard, EVA, rubber, dermis, glass fiber, ethylene vinyl acetate copolymer, polyolefin, thermoplastic polyurethane, polyurethane foam, polymer fiber and graphite fiber, and most preferably one or more of the following: EVA, rubber, dermis, artificial leather, ethylene vinyl acetate copolymer, polyolefin, thermoplastic polyurethane and polyurethane foam.

Said "applying" may be applying the adhesive to the entire surface of the substrate or only to one or more portions of the substrate surface.

Said "applying" may be brushing, dipping, spraying, roller coating, knife coating, flow coating, casting, printing or transfer printing, preferably brushing, dipping or spraying.

Said "heating and drying the substrate surface to which the adhesive is applied" may refer to only heating and drying the substrate surface, or heating and drying the partial or entire substrate including the substrate surface to which the adhesive is applied.

Said "heating and drying" can remove a volatile component. The volatile component can be water.

Said "heating and drying" is preferably one or more of the following: infrared heat radiation, near-infrared heat radiation, microwaves, and use of a convection oven or a spray dryer at an elevated temperature.

The heating temperature is as high as possible, but should not be above the temperature limit at which the substrate is subject to deformation or other damages in any uncontrolled manner.

The irradiation by means of actinic radiation is preferably carried out when the surface temperature of the substrate treated in step ii is not lower than 35° C., most preferably immediately after the treatment in step ii.

Said "irradiating the substrate surface treated in step ii by means of actinic radiation" may refer to only irradiating the substrate surface, or irradiating the partial or entire substrate including the substrate surface.

The actinic radiation crystallizes and cures the adhesive.

The actinic radiation is preferably UV radiation, solar radiation, radiation with an inert gas or an oxygen-depleted gas in the absence of oxygen or radiation with a radiation-transparent medium covering the site to be irradiated, most preferably UV radiation or solar radiation.

The inert gas is preferably nitrogen or carbon dioxide. The radiation-transparent medium is preferably a synthetic film, glass or a liquid such as water.

In the UV radiation or solar radiation, it is possible to use medium or high pressure mercury vapor lamps, optionally doped with other elements such as gallium or iron to modify the mercury vapor, or use laser, pulsed lamps, halogen lamps or excimer radiators.

The actinic radiation is most preferably UV radiation. In the UV radiation, it is most preferred to use fixed mercury radiation.

When the substrate has a three-dimensional surface of a complicated shape, it is preferred to use a plurality of radiation devices for radiation, which are reasonably arranged to uniformly irradiate the surface.

The wavelength of the actinic radiation is preferably 200 nm to 750 nm.

The dose of the actinic radiation is preferably no less than 80 mJ/cm$^2$, further preferably 80 mJ/cm$^2$ to 5000 mJ/cm$^2$, more preferably 200 mJ/cm$^2$ to 2000 mJ/cm$^2$, and most preferably 1250 mJ/cm$^2$ to 1950 mJ/cm$^2$.

Within the above range, the radiation dose of actinic radiation is as high as possible, but should not be above the radiation dose limit at which the substrate is subject to deformation or other damages in any uncontrolled manner.

Said "contacting" is carried out preferably before the temperature of the substrate surface is lower than the temperature at which the adhesive is bondable, further preferably before the temperature of the substrate surface is not lower than 60° C.

The substrate surface treated in step iv is contacted with the substrate itself or an additional substrate preferably within one hour, further preferably within 30 minutes, more preferably within 10 minutes, and most preferably within 5 minutes to obtain the bonded product.

The additional substrate can be any substrate that needs to be bonded.

The additional substrate may be the same as or different from the substrate.

Like the substrate, the additional substrate is preferably coated, heated and treated by means of actinic radiation.

Preferably, the additional substrate is not treated with a primer, high energy radiation or ozone prior to contact with the substrate surface.

The high energy radiation can be ionizing radiation, in particular plasma.

After contacting the substrate surface treated in step ii or treated in step iv with the substrate itself or the additional substrate, a further heat treatment may be performed.

After contacting the substrate surface treated in step ii or treated in step iv with the substrate itself or the additional substrate, a further cooling treatment may be performed to lower the temperature of the bonded product to room temperature.

The method of introducing heat is preferably one or more of the following: use of a convection oven or a spray dryer at an elevated temperature, infrared heat radiation, near-infrared heat radiation, microwaves, and heat transfer by means of an object contacted with the substrate coated with the adhesive according to the present invention.

Preferably, it is not necessary to introduce heat to the substrate surface before contacting the substrate surface treated in step ii or treated in step iv with the substrate itself or the additional substrate.

Bonded Product

The bonded product is preferably a shoe.

Examples

All technical and scientific terms used herein have the same meaning as commonly understood by those skilled in the art to which the present invention belongs, unless otherwise defined. When the definition of a term in the present description conflicts with the meaning as commonly understood by those skilled in the art to which the present invention belongs, the definition described herein shall apply.

All numerical values expressing amount of ingredients, reaction conditions and the like which are used in the description and claims are to be understood as being modified by the term "about", unless otherwise specified. Accordingly, unless indicated to the contrary, the numerical values and parameters described herein are approximate values which can be varied according to the desired performance obtained as required.

The term "and/or" used herein refers to one or all of the elements mentioned.

The terms "containing", "including" and "comprising" used herein cover both the case that there are only the elements mentioned and the case that there are also other elements unmentioned in addition to the elements mentioned.

All percentages in the present invention refer to weight percentage, unless otherwise specified.

The analysis and measurement in the present invention are carried out at a temperature of 23° C., unless otherwise specified.

The grammatical articles "one", "a", "an", and "the", as used in this specification, are intended to include "at least one" or "one or more", unless otherwise specified. By way of example, "a component" means one or more components, and thus, possibly, more than one component is contemplated and may be employed or used in an implementation of the described embodiments.

The solid content of the aqueous polyurethane dispersion is measured according to DIN-EN ISO 3251 using a HS153 moisture analyzer from Mettler Toledo.

The isocyanate group (NCO) content is determined by volume according to DIN-EN ISO 11909 and the measured data includes both free and potentially free NCO contents.

The isocyanate functionality is determined by GPC.

The pH value is measured at 23° C. using a PB-10 pH meter from Sartorius, Germany.

The number average molecular weight is determined by gel permeation chromatography using tetrahydrofuran as the mobile phase and control polystyrene standards at 23° C.

The hydroxyl value is determined in accordance with ASTM D4274.

Raw Materials and Reagents

Desmophen® 3600: a low-functionality polyether polyol having a functionality of 2, a number average molecular weight of 2000 g/mol and a hydroxyl value of 56 mg KOH/g, available from Covestro AG, Germany.

Desmodur® T-80: toluene diisocyanate mixture, available from Covestro AG, Germany.

Tetrasodium ethylenediamine tetraacetate (EDTA4Na): the pH value of its aqueous solution having a content of tetrasodium ethylenediamine tetraacetate of $4.3*10^{-7}$ mol/g is 10.35, and its solubility measured at room temperature of 20° C. is 100 g/100 g, available from Sinopharm Chemical Reagent Co., Ltd.

Sodium pyrophosphate: the pH value of its aqueous solution having a content of sodium pyrophosphate of $4.3*10^{-7}$ mol/g is 9.89, and its solubility measured at room temperature of 20° C. is 6.2 g/100 g, available from Sinopharm Chemical Reagent Co., Ltd.

Nitrilotriacetic acid: the pH value of its aqueous solution having a content of nitrilotriacetic acid of $4.3*10^{-7}$ mol/g is 2.92, and its solubility measured at room temperature of 20° C. is <0.01 g/100 g, available from Sinopharm Chemical Reagent Co., Ltd.

2,6-Di-tert-butyl-4-methylphenol: an organic antioxidant, available from Merck Chemical.

Preparation of the Compositions in Inventive Examples and Comparative Examples

Preparation of Aqueous Polyurethane Dispersions 380.2 g of Desmophen® 3600 was dehydrated at 110° C. and 15 mbar for 1 hour, and 7.6 g of 2,2-dimethylolpropionic acid was added and cooled while stirring. 62.8 g of Desmodur® T-80 was added at 60° C. and stirred at 80-90° C. until an isocyanate content of 2.1% was reached. The mixture was then dissolved in 676 g of acetone and cooled to 50° C. to obtain a reaction solution. 7.3 g of an aqueous solution of sodium hydroxide having a concentration of 31% was added to the reaction solution and stirred for 5 minutes, followed by the addition of a solution of 6.8 g of 2-(2-aminoethoxy)ethanol in 41 g of water. After vigorously stirring for 30 minutes, 648 g of water was added to disperse the mixture, followed by distillation to separate off acetone to obtain an aqueous polyurethane dispersion having a solid content of 40.1 wt %.

Preparation of Compositions

Table 1 shows the composition and performance test results of the compositions in inventive examples and comparative examples.

The organic antioxidant, the chelating agent and the prepared aqueous polyurethane dispersion in amounts as shown in Table 1 were mixed, and the mixture was stirred or shaken to obtain a homogeneous composition.

Performance Test

Method for Testing Yellowing Resistance 20 g of each of the compositions in inventive examples and comparative examples was weighed, poured into a flat-bottomed Teflon pan, and stored at room temperature to obtain a dry coating. The coating thickness is 0.74 mm±0.08 mm. The coating was evenly cut into several pieces, one of which was baked in an oven at 80° C. for 7 hours. The remaining coating continues to be stored at room temperature as a reference for color change comparison.

The color contrast is based on the CIELAB method. The L, a, b values were tested with a BYK colorimeter upon placing the samples on the same white background. The Δb value is equal to the difference between the b value of the sample subject to the high-temperature treatment and that of the same sample stored at room temperature without the high-temperature treatment. The larger the Δb value is, the greater the degree of yellowing of the sample is.

The performance test results are shown in Table 1.

TABLE 1 the composition and performance test results of the compositions in inventive examples (Ex) and comparative examples (CE)

| | Weight of solid components of the aqueous polyurethane dispersion/g | 2,6-Di-tert-butyl-4-methyl-phenol/g | Chelating agent/g | | | Δb |
|---|---|---|---|---|---|---|
| | | | Sodium pyro-phosphate | EDTA4Na | Nitrilotri-acetic acid | |
| Ex 1 | 100 | 0.1 | | 0.5 | | 1.59 |
| Ex 2 | 100 | 0.1 | | 1 | | 0.97 |
| Ex 3 | 100 | 1 | 0.5 | | | 2.04 |
| Ex 4 | 100 | 1 | | | 1 | 1.50 |
| Ex 5 | 100 | 2 | 0.1 | | | 2.04 |
| CE 1 | 100 | | | | | 8.71 |
| CE 2 | 100 | 2.5 | | | | n.b. |
| CE 3 | 100 | 1 | | | | 3.47 |
| CE 4 | 100 | 0.01 | | | | 3.13 |
| CE 5 | 100 | | 0.02 | | | 3.84 |
| CE 6 | 100 | | | 1 | | 2.97 |
| CE 7 | 100 | | | | 1 | 3.18 | n.b.: the composition flocculates and cannot form a coating.

When comparing the inventive examples 1-5 and the comparative examples 1-7, it can be seen that the coatings formed by using the compositions according to the present invention have much smaller Δb values than those in case of the comparative compositions, indicating that the yellowing resistance of the coatings formed by using the compositions according to the present invention is much better than that in case of the comparative compositions.

It is apparent to those skilled in the art that the present invention is not limited to the specific details described above, and may be embodied in other specific forms without departing from the spirit or essential characteristics of the present invention. The Examples are to be considered in all respects as illustrative but not restrictive, so that the scope of the present invention is defined by the claims rather than the foregoing description. Thus, any change, as long as it belongs to the meaning and range of equivalents of the claims, should be considered as part of this invention.

The invention claimed is:
1. A composition comprising:
  (a) a polyurethane polymer which is a reaction product of a reaction mixture comprising:
    (a1) a polyisocyanate,
    (a2) a compound having an isocyanate-reactive group, which comprises a polymer polyol comprising a polyether polyol and/or a polyolefin polyol,
    (a3) optionally an emulsifier,
    (a4) optionally a solvent, and
    (a5) optionally a reactive diluent;
  (b) an organic antioxidant in an amount of 0.01 wt % to 2.4 wt %, based on a total weight of solid components of the composition;
  (c) a chelating agent, wherein the chelating agent (c) has an amount of 0.04 wt % to 1.8 wt %, based on the total weight of solid components of the composition and is present in the form of one or more of the following: a chelating agent salt and a chelating agent acid, wherein the chelating agent salt is a water-soluble chelating agent salt comprising an ethylenediamine tetraacetate, a tartrate, a citrate, a pyrophosphate, a tripolyphosphate, a hexametaphosphate, a gluconate, or a combi- nation thereof or the chelating agent acid comprises ethylenediamine tetraacetic acid, nitrilotriacetic acid, tartaric acid, citric acid, pyrophosphoric acid, gluconic acid, or a combination thereof;
(d) water;
(e) optionally a stabilizer;
(f) optionally a crosslinking agent; and
(g) optionally an additive.

2. The composition according to claim 1, comprising an amount of from 70 wt % to 100 wt % of the polymer polyol, based on a total weight of the compound (a2) having an isocyanate-reactive group.

3. The composition according to claim 1, comprising an amount of from 0.06 wt % to 2.0 wt % of the organic antioxidant (b), based on the total weight of solid components of the composition.

4. The composition according to claim 1, wherein the chelating agent salt is a water-soluble chelating agent salt comprising an ethylenediamine tetraacetate, a tartrate, a citrate, a pyrophosphate, a tripolyphosphate, a hexametaphosphate, a gluconate, or a combination thereof.

5. The composition according to claim 1, wherein the chelating agent acid comprises ethylenediamine tetraacetic acid, nitrilotriacetic acid, tartaric acid, citric acid, pyrophosphoric acid, gluconic acid, or a combination thereof.

6. The composition according to claim 1, wherein the stabilizer (e) comprises a carbodiimide compound, an epoxy compound, an oxazoline compound, an aziridine compound, or a combination thereof in an amount of 0.5 wt % to 10 wt % based on the total weight of solid components of the composition.

7. The composition according to claim 1, wherein the composition is a coating or an adhesive.

8. A method for producing a composition according to claim 1, comprising mixing, in any desired manner, the polyurethane polymer (a) or the components for preparing the polyurethane polymer (a), the organic antioxidant (b), the chelating agent (c), water (d), optionally a stabilizer (e), optionally a crosslinking agent (f), and optionally an additive (g).

9. The method according to claim 8, wherein the polyurethane polymer (a) and water (d) are combined to form an aqueous polyurethane dispersion, and then the organic antioxidant (b), the chelating agent (c), optionally a stabilizer (e), optionally a crosslinking agent (f) and optionally an additive (g) are introduced to the aqueous polyurethane dispersion to obtain the composition.

10. The method according claim 8, wherein the chelating agent (c) is added in the form of an aqueous solution.

11. A coating method comprising applying a composition according to claim 1 to a substrate surface and then curing it.

12. A coated product comprising a substrate and a coating formed by applying a composition according to claim 1 to the substrate.

13. A method for producing a bonded product comprising:
 i. applying a composition according to claim 1 to at least one surface portion of a substrate;
 ii. heating and drying the substrate surface portion to which the composition is applied; and
 iii. contacting the substrate surface portion treated in step ii with an additional surface portion of the substrate itself or an additional substrate to obtain the bonded product.

14. The method according to claim 13, further comprising a step iv between step ii and step iii:
 iv. irradiating the substrate surface treated in step ii by means of actinic radiation.

15. The method according to claim 13, wherein the substrate comprises wood, plastic, metal, glass, textile, alloy, fabric, artificial leather, paper, cardboard, EVA, rubber, dermis, glass fiber, ethylene vinyl acetate copolymer, polyolefin, thermoplastic polyurethane, polyurethane foam, polymer fiber, graphite fiber, or a combination thereof.

16. A bonded product produced by the method according to claim 13.

17. The composition according to claim 1, wherein the reaction mixture further comprises a dibutyltin dilaurate catalyst.

* * * * *